(12) United States Patent
FitzGerald et al.

(10) Patent No.: US 7,797,387 B2
(45) Date of Patent: Sep. 14, 2010

(54) INTERACTIVE TEXT COMMUNICATION SYSTEM

(75) Inventors: Cary W. FitzGerald, Palo Alto, CA (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1315 days.

(21) Appl. No.: 11/237,271

(22) Filed: Sep. 27, 2005

(65) Prior Publication Data

US 2007/0038943 A1 Feb. 15, 2007

Related U.S. Application Data

(63) Continuation-in-part of application No. 11/204,896, filed on Aug. 15, 2005, now abandoned.

(51) Int. Cl.
G06F 15/16 (2006.01)
G06F 3/00 (2006.01)

(52) U.S. Cl. .......... 709/206; 709/204; 715/751

(58) Field of Classification Search ......... 715/751–752, 715/761, 970; 709/206, 204
See application file for complete search history.

(56) References Cited

U.S. PATENT DOCUMENTS 6,449,344 B1  9/2002  Goldfinger et al.
6,460,074 B1* 10/2002  Fishkin ............. 709/206
6,791,583 B2* 9/2004  Tang et al. ........... 715/751
6,920,478 B2  7/2005  Mendiola et al.

OTHER PUBLICATIONS

Fajman et al. (Stanford University Computation Center May 1973) WYLBUR: An Interactive Text Editing and Remote Job Entry System, pp. 315-316 and 318-319.*

* cited by examiner

*Primary Examiner*—Peling A Shaw
(74) *Attorney, Agent, or Firm*—Stolowitz Ford Cowger LLP

(57) ABSTRACT

A communication system quarantines text and then automatically transmits the text across a network at the end of a quarantine time period. This text quarantine period gives a user the chance to edit or delete text for a brief amount of time after the text has been entered. This allows editing or deletion of spelling errors, and inadvertent or indiscriminate text responses before the text is sent to a remote user. Since the text characters are automatically transmitted after the quarantine period, normal human communications and interactions are maintained allowing a receiver to interject or interrupt with text comments in the middle of a received text message. Thus, the communication system maintains the interactive advantages of TTY/TDD systems while also providing the editing flexibility of instant messaging systems. In another aspect of the text system, characters are buffered until they form a complete expression. Upon detection of the completed expression, the buffered characters are sent to the destination endpoint.

21 Claims, 11 Drawing Sheets

INTERACTIVE TEXT COMMUNICATION SYSTEM

CROSS REFERENCE TO RELATED APPLICATIONS

This application is a continuation-in-part of prior application Ser. No. 11/204,896, filed Aug. 15, 2005, now abandoned entitled "INTERACTIVE TEXT COMMUNICATION SYSTEM".

FIELD OF THE INVENTION

The present invention is related to text communications, and more specifically to devices, software, and methods for transmitting, receiving, and displaying text over a communications network.

DESCRIPTION OF THE RELATED ART

A teletypewriter ("TTY") or a telecommunication device for the deaf ("TDD") provides substantially real-time text communications by immediately sending text as soon as the text characters are entered or typed into the TTY/TTD device. One drawback to TTY/TDD devices is that users do not have an opportunity to change the text once it is entered. Thus, each spelling mistake entered into a TTY/TDD terminal is faithfully displayed to a recipient. Accordingly, word processing features, such as cut and paste operations are not available in TTY/TTD devices.

Instant Messaging (IM) and other text messaging systems provide semi-real time text communications where text is not sent until manually initiated by the sender. For example, most IM systems do not transmit text until the user presses a keyboard return key or a keypad send key. Instant messaging systems allow a user to cut, paste, edit, and otherwise contemplate the content of a batched group of text prior to manually sending the text to the recipient. Unfortunately, these batched text transmissions inhibit the normal dynamics of human conversation.

For example, many human voice conversations may have the listener interrupting the talker in mid-sentence to clarify or redirect the conversation. These dynamic interactions are not possible in text messaging systems since communications can only be exchanged after the sender enters a complete text message and then manually initiates transmission of the text message to a receiver. Thus, the receiver of the text message has no ability to interrupt the batched text message. The context of a text response by the receiver to a particular text message can also be lost or confused with previous text messages, further complicating communication dynamics.

The present invention addresses this and other problems associated with the prior art.

BRIEF SUMMARY OF THE INVENTION

A communication system quarantines text and then automatically transmits the text across a network at the end of a quarantine time period. This text quarantine period gives a user the chance to edit or delete text for a brief amount of time after the text has been entered. This allows editing or deletion of spelling errors, and inadvertent or indiscriminate text responses before the text is sent to a remote user. Since the text characters are automatically transmitted after the quarantine period, normal human communications and interactions are maintained allowing a receiver to interject or interrupt with text comments in the middle of a received text message. Thus, the communication system maintains the interactive advantages of TTY/TDD systems while also providing the editing flexibility of instant messaging systems. In another aspect of the communication system, characters are buffered until they form a complete expression. Upon detection of the completed expression, the buffered characters are sent to the destination endpoint.

The foregoing and other objects, features and advantages of the invention will become more readily apparent from the following detailed description of a preferred embodiment of the invention which proceeds with reference to the accompanying drawings.

DETAILED DESCRIPTION OF THE INVENTION

Figure 1:
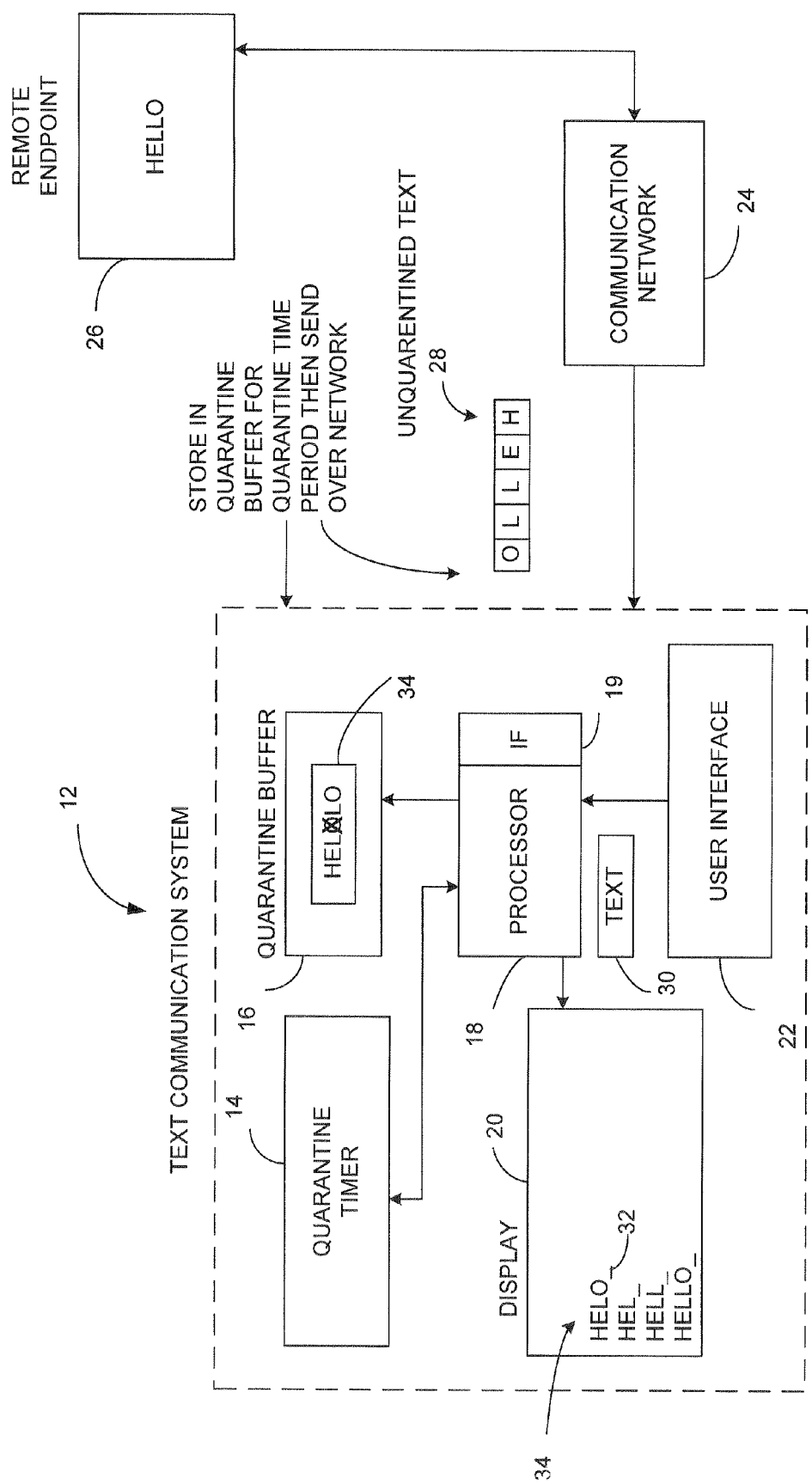
FIG. 1 is a block diagram of a text communication system.

FIG. 1 shows a text communication system 12 used for sending text to a remote endpoint 26. The text communication system 12 can be implemented in any type of device capable of transmitting text over a communication network 24. For example, the text communication system 12 may be a TTY/TDD terminal, cell phone, computer terminal, Personal Digital Assistant (PDA), or any other device that transmits text either wirelessly or over a land line. The remote endpoint 26 can also be any type of text communication device that sends and receives text.

In one embodiment, the communication network 24 is a Wide Area Network (WAN) that includes any combination of packet and circuit switched networks. For example, different portions of communication network 24 may include a Public Switched Telephone Network (PSTN) network, an Internet Protocol (IP) network, cellular phone network, etc.

The text communication system 12 includes a user interface 22, such as a keyboard on a personal computer, keypad on a cell-phone or PDA, mouse, speech recognition system that translates human speech into text, etc. The user interface 22 is used by an operator to generate text characters 30 that are received by a processor 18 and displayed on display 20.

A quarantine buffer 16 is used by the processor 18 to quarantine the text 30 for a predetermined quarantine or provisional time period prior to transmitting the un-quarantined text 28 via network interface 19 over the communication network 24 to the remote endpoint 26. A quarantine timer 14 is used by the processor 18 to monitor the quarantine periods for the characters in text 30. The quarantine timer 14 is shown as a separate block in text communication system 12 but may be located internally in the processor 18.

Figure 2:
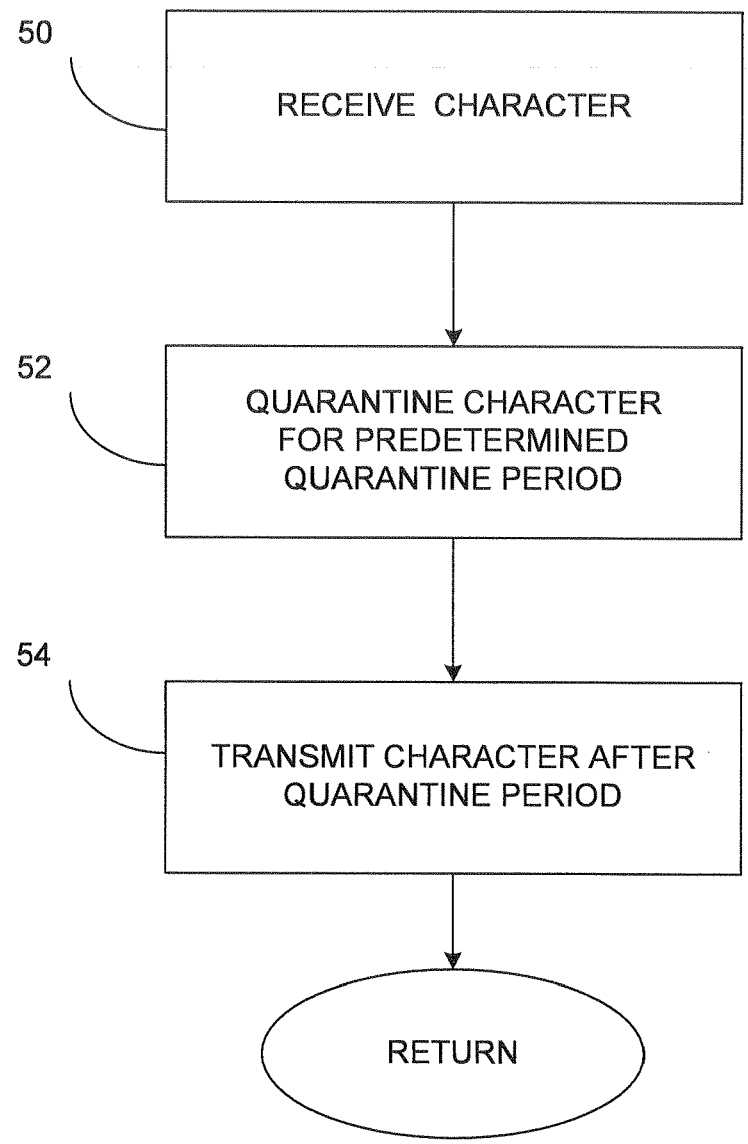
FIG. 2 is a flow diagram showing how the text communication system in FIG. 1 operates.

Referring both to FIGS. 1 and 2, the text communication system 12 receives text characters from the user interface 22 in operation 50. The processor 18 quarantines the received characters in the quarantine buffer 16 for a predetermined quarantine period in operation 52. During the quarantine time period, the quarantined text in buffer 16 can be edited or deleted. This allows a user to correct spelling errors or completely delete portions of previously entered text that the operator decides "after the fact" should not be sent to the remote device 26.

For example, the user may have incorrectly entered the characters "HELO" into the user interface 22, intending to spell the word "HELLO". During the quarantine period, the user can backspace a cursor 32, or conduct a conventional highlight and delete operation, over the quarantined text 34. Other conventional word processing operations, such as "cut and paste" operations can also be performed. After an associated expiration of the quarantine period in the quarantine buffer 16, each remaining character is then automatically sent as un-quarantined text 28 over communication network 24 to remote endpoint 26.

Quarantining allows the text to be modified, after the text is already entered into the user interface 22. This provides the "after the fact" text editing that is not provided in current TTY/TTD terminals. However, each character is then automatically sent to the remote endpoint 26 by processor 18 after a relatively short quarantine period (e.g., 3-15 seconds). This provides more interactive text communication than existing instant messaging systems that require a user to manually press a send or return key before a batch of text can be transmitted to the remote endpoint 26.

The text communication system 12 can also provide user controlled text quarantine time periods and can identify quarantined and un-quarantined text as will be described in more detail below. Other aspects of the text communication system 12 provide more interactive techniques for displaying text, as will also be described later in more detail.

Quarantine Control

Figure 3A:
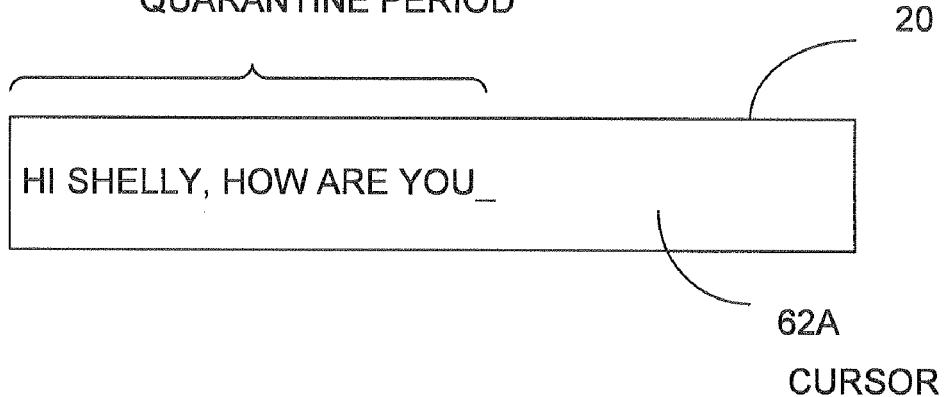
FIGS. 3 and 4 show how the text communication system controls text quarantine according to a cursor or mouse position.
Figure 3B:
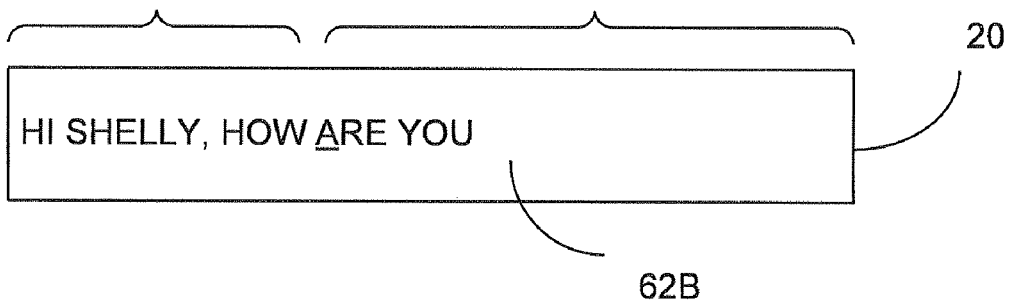

FIGS. 3A and 3B show another aspect of the text communication system that allows the user to control the quarantine period for quarantined text. Referring first to FIG. 3A, a user may enter the text "Hi Shelly, how are you_" into the user interface 22 (FIG. 1). The text is then displayed on display 20. The symbol "_" represents the location of a cursor in the display 20. All the characters to the left of the cursor position 62A are quarantined as described above in FIGS. 1 and 2. After the associated quarantine periods have expired, the individual characters in FIG. 3A are automatically sent to the remote endpoint 26 (FIG. 1).

Referring now to FIG. 3B, the user may move the cursor position some number of characters to the left prior to the expiration of the quarantine period for some or all of the characters shown on display 20. In this example, the user may move the cursor to position 62B below the character "a" in the word "are" before any of the characters shown in display 20 have been un-quarantined. In response, the processor 18 (FIG. 1) automatically stalls or resets the quarantine countdown for the characters above or to the right of the new cursor position 62B. In this example, the quarantine countdown is reset or stalled for all of the characters in the text "are you". However, the quarantine countdown for all the text to the left of cursor position 62B continues and upon expiration the text "Hi Shelly, how" is sent to the remote endpoint 26 (FIG. 1). As soon as the cursor position is moved to the right of any of the characters "are you", the quarantine countdown is continued or restarted for those characters.

Note that the cursor terminology "left" and "right" is used in relation to English text, but is not so limited for other types of text. If the invention is employed with other forms of text, these terms will be understood to encompass respectively "up" and "down" (e.g., for Chinese text) or "right" and "left" (e.g., for Hebrew or Arabic text). The terminology "preceding" and "following" refers to text that precedes and follows, respectively, other text in its respective language. For example, in the English language, text that is left of the cursor position precedes the cursor and text that is right of the cursor follows the cursor. On the other hand, in Hebrew text, text that is left of the cursor follows the cursor and text that is right of the cursor precedes the cursor. The system described above can be used for any of these types of text.

Figure 4:
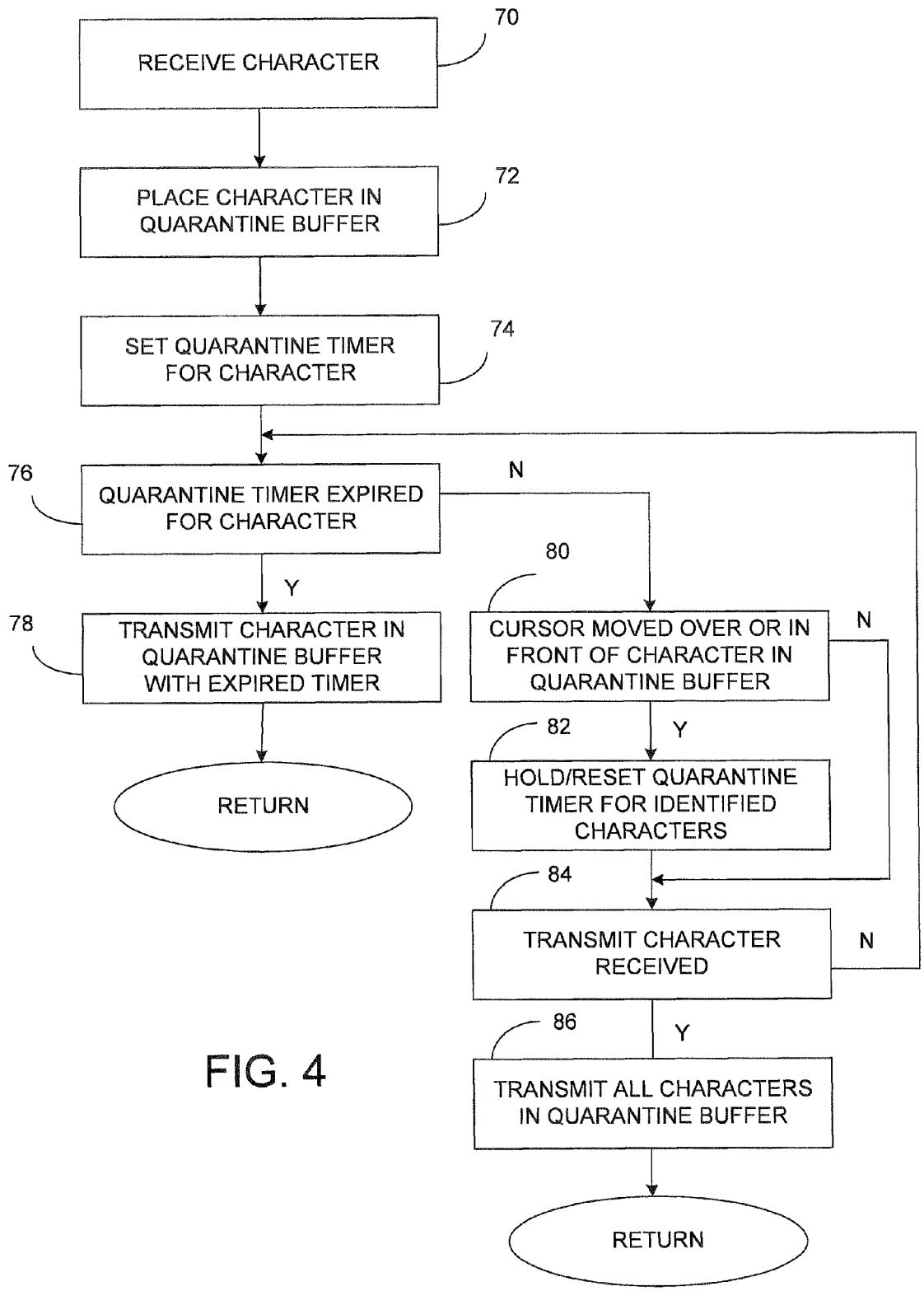

FIG. 4 describes in more detail how the text communication system 12 in FIG. 1 controls text quarantine according to cursor or mouse position as described above in FIGS. 3A and 3B. In operation 70, the processor 18 receives a character. The character is placed in the quarantine buffer 16 in operation 72 and an associated quarantine timer 14 is set in operation 74. There may be one quarantine timer associated with multiple characters, or there may be separate quarantine timers for each character.

The processor 18 checks to see if the quarantine timer associated with the character has expired in operation 76. When the quarantine timer has expired, the character is automatically transmitted in operation 78. While text is still quarantined, the processor in operation 80 determines if the cursor has moved under or in front of any of the currently quarantined characters. If so, the quarantine timer(s) for the identified characters are either stopped or reset in operation 82. If the cursor continues to be positioned under, or to the left, of characters in operation 80, those characters may remain in the quarantined state indefinitely until the cursor is moved to the right of those characters.

If a transmit character or command is detected in operation 84, the processor in operation 86 may immediately transmit all of the currently quarantined characters in the quarantine buffer 16 (FIG. 1). For example, the processor 18 may immediately send all currently quarantined characters when a return character is received from the user interface 22 (FIG. 1). Of course, other commands and character combinations can also be used. For example, if the endpoint device is a cell-phone, the send key may cause the processor 18 to immediately send all quarantined characters. In another example, the user may be able to configure a special character, or combination of characters, that cause all currently quarantined characters to be sent. For example, the user may configure the text communication system 12 to immediately transmit quarantined characters when the combination of characters "GA" (for go ahead) are detected.

Displaying Quarantined Text to a User

Figure 5:
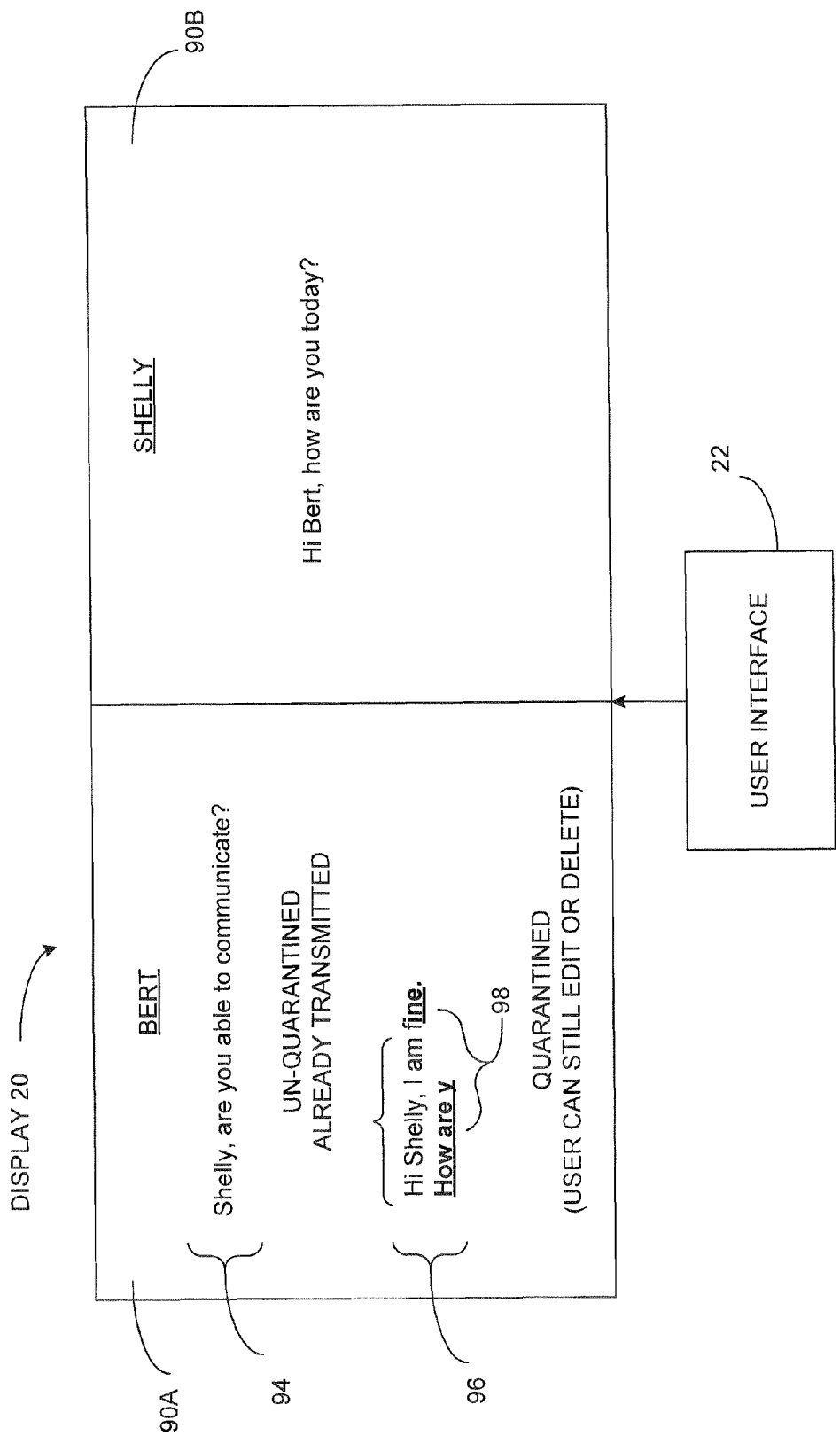
FIGS. 5 and 6 show how the text communication system displays quarantined text differently than un-quarantined text.
Figure 6:
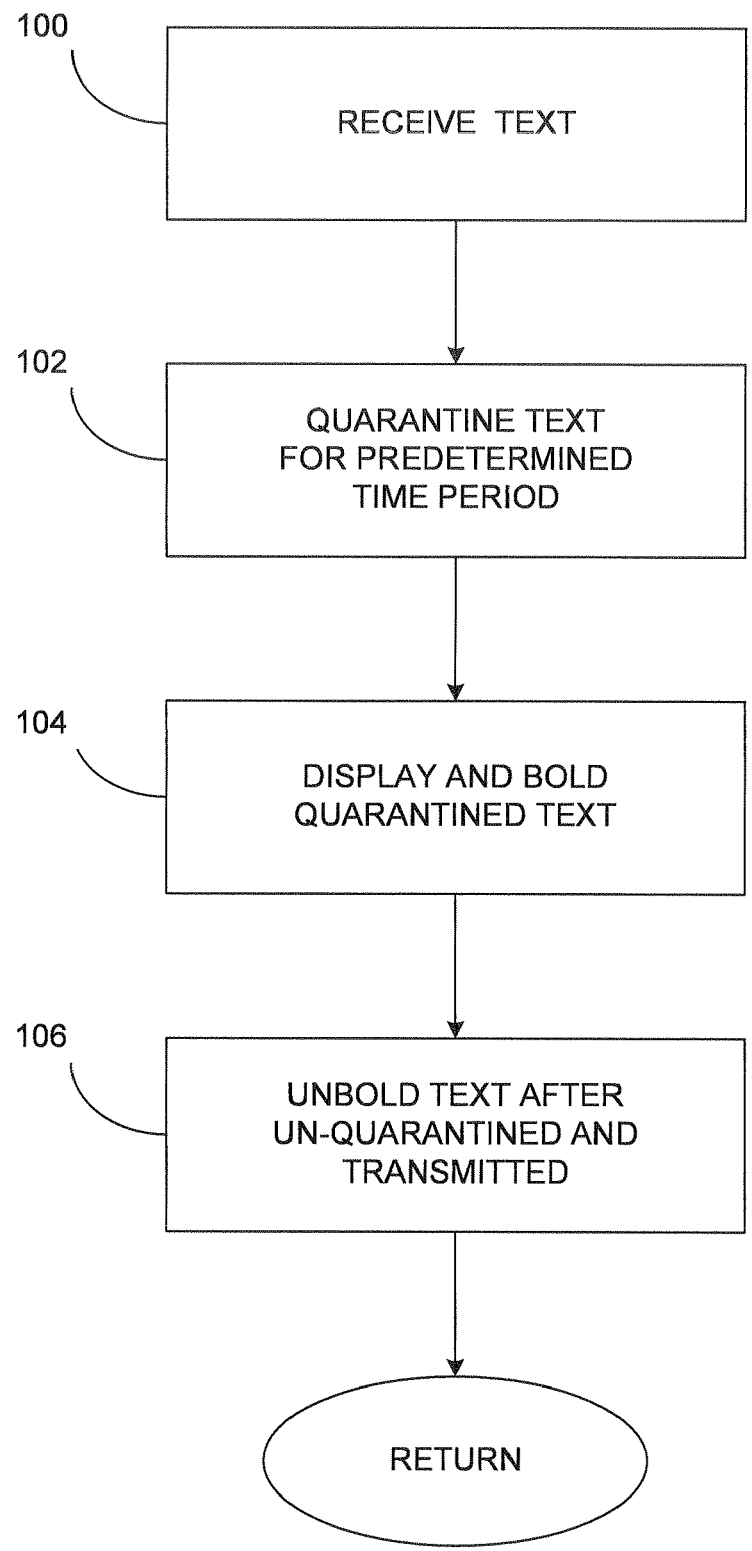

FIGS. 5 and 6 show one example of how the text communication system 12 in FIG. 1 may display quarantined and un-quarantined text to a user. In FIG. 5, the display 20 is separated into a left dialog box 90A for displaying text generated from a local user and a right dialog box 90B for displaying the text received from a remote user operating remote endpoint 26.

Referring both to FIGS. 5 and 6, text is received from user interface 22 in operation 100. The text is quarantined for a predetermined time period in operation 102 as described above. In this example, any text from the local user interface 22 that is still in a quarantine state is bolded in operation 104 and any text that is no longer in the quarantine state is un-bolded. For example, a set of text 94 "Shelly, are you able to communicate?" was previously typed, quarantined, un-quarantined, and then sent to the remote user. Accordingly, the set of text 94 was previously displayed in bold in operation 104 and then un-bolded in operation 106.

The next set of text 96 received from the user interface 22 is partially in a quarantine state and partially in an un-quarantined state. For example, a first set of characters 95 have been received, quarantined, un-quarantined, and transmitted to the remote endpoint 26. Accordingly, the characters 95 are shown as unbolded. In one implementation, the user cannot delete or modify the text 95 once the bolding is removed by the processor 18. In another embodiment, the processor 18 may also prevent the cursor from moving back under, or in front of, any un-bolded text.

A second set of characters 98 in text 96 are still in the quarantine state and therefore are bolded by the processor 18 in operation 104. Any bolded characters 98 can be edited or deleted by the local user. For example, the user could cut any bolded or non-bolded text displayed in dialog box 90A or 90B and paste and write over the bolded characters 98. In this cut and paste example, the processor 18 might allow the cursor or mouse to move back in front of un-bolded text 95.

Any type of display technique can be used to distinguish un-quarantined characters 95 from quarantined characters 98. For example, instead of bolding, quarantined and un-quarantined characters may be displayed in a different colors, fonts, type, underlining, or by changing some other display mechanism/indicator. In another example, a small arrow or line can be used to indicate that all text preceding the arrow has been sent. The text communication system 12 may also allow the local user to select between these different display options for identifying quarantined and un-quarantined text.

Improved Text Display

The manner that text is displayed on a screen can improve the interaction during text communications. For example, voice conversations between two persons often may include multiple interruptions by the different speakers. However, present text messaging and instant messaging systems do not allow for similar interruptions. It is also common in normal voice communications for a speaker to invite the listener to start talking simply by trailing off in a sequence of utterances or simply by no longer talking. There is also no current technique in text messaging systems for simulating this same communication dynamic.

Figure 7:
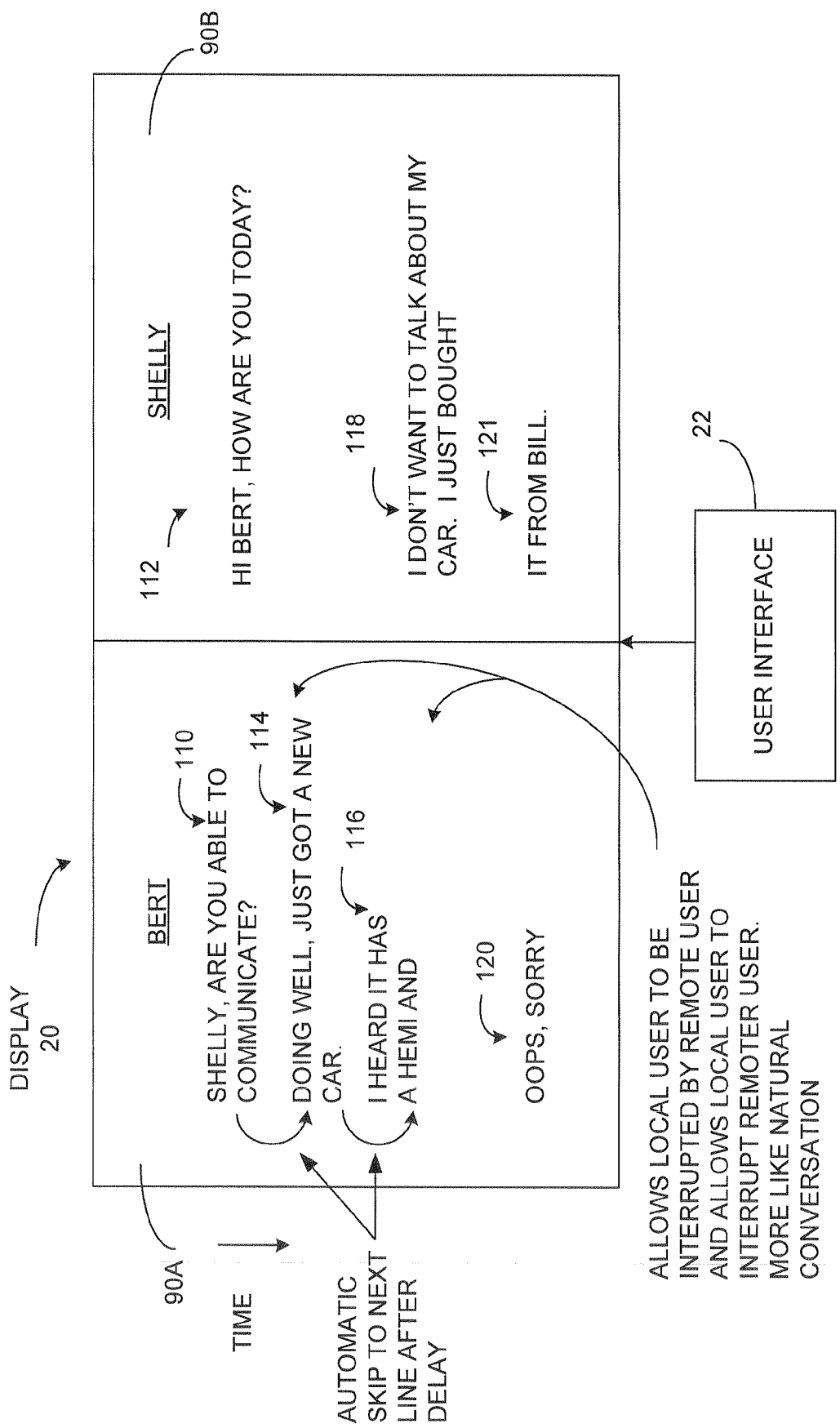
FIG. 7 shows how text from a local device and a remote device can be displayed on a screen to improve communication dynamics.

Referring to FIG. 7, the text communication system can initiate line breaks for different text communication events that provide more interactive text conversations. In one implementation, the text communication system 12 automatically moves to a next line (e.g., line return) when no characters are entered for some predetermined period of time. For example, a local user may enter the string of text 110 "Shelly, are you able to communicate?" without ever pressing a send or return key. After a predetermined amount of time after entering the final "?" character, the processor 18 may automatically cause the next text 114 entered by the local user to be displayed on another line on display 20. This prevents the user from having to manually hit a return or send key and also provides some real-time indication of when the user stopped communicating.

The processor can also display any text from the remote endpoint 26 that may have been received prior to receiving the next string of text 114 from the local user. For example, the processor 18 may display the text 112 "Hi Bert, how are you?" in dialog box 90B on the same line as text 110 or directly below text 110. This indicates that the remote text 112 was received prior to the local user entering the next string of local text 114. Of course, other physical display positions can also be used to identify the time relationship between the local text in dialog box 90A and the remote text in dialog box 90B.

The processor 18 can also allow one user to interrupt another to promote a more interactive text conversation. For example, in text 116, the local user starts discussing Shelly's new car. The processor 18 receives remote text 118 before the local user completes the sentence in text 116. The processor 18 may automatically display the remote text 118 from the remote endpoint 26 and cause the local text 116 from the local user interface 22 to either terminate or be moved to another line.

This allows the user at the local interface 22 to discontinue a sentence if it is no longer germane after the text interruption 118. For example, the local user sends text 116 inquiring about Shelly's car. However, during the inquiry in text 116, the remote user interrupts with text 118 directing the local user to stop discussing the car. The local user can then discontinue entering text 116 discussing Shelly's car and move onto another subject.

The local user can also interrupt the remote user by entering local text 120 before the remote user completes the sentence in text 118. In this example, the local text 120, "Oops, sorry", may be received at the remote endpoint 26 before the remote user completes the sentence in text 118. The remote user at the remote endpoint 26 may therefore not need to send any additional text 118 directing the local user to stop discussing Shelly's car. If additional text 121 is sent by the remote user, it can be displayed on another display line.

Figure 8:
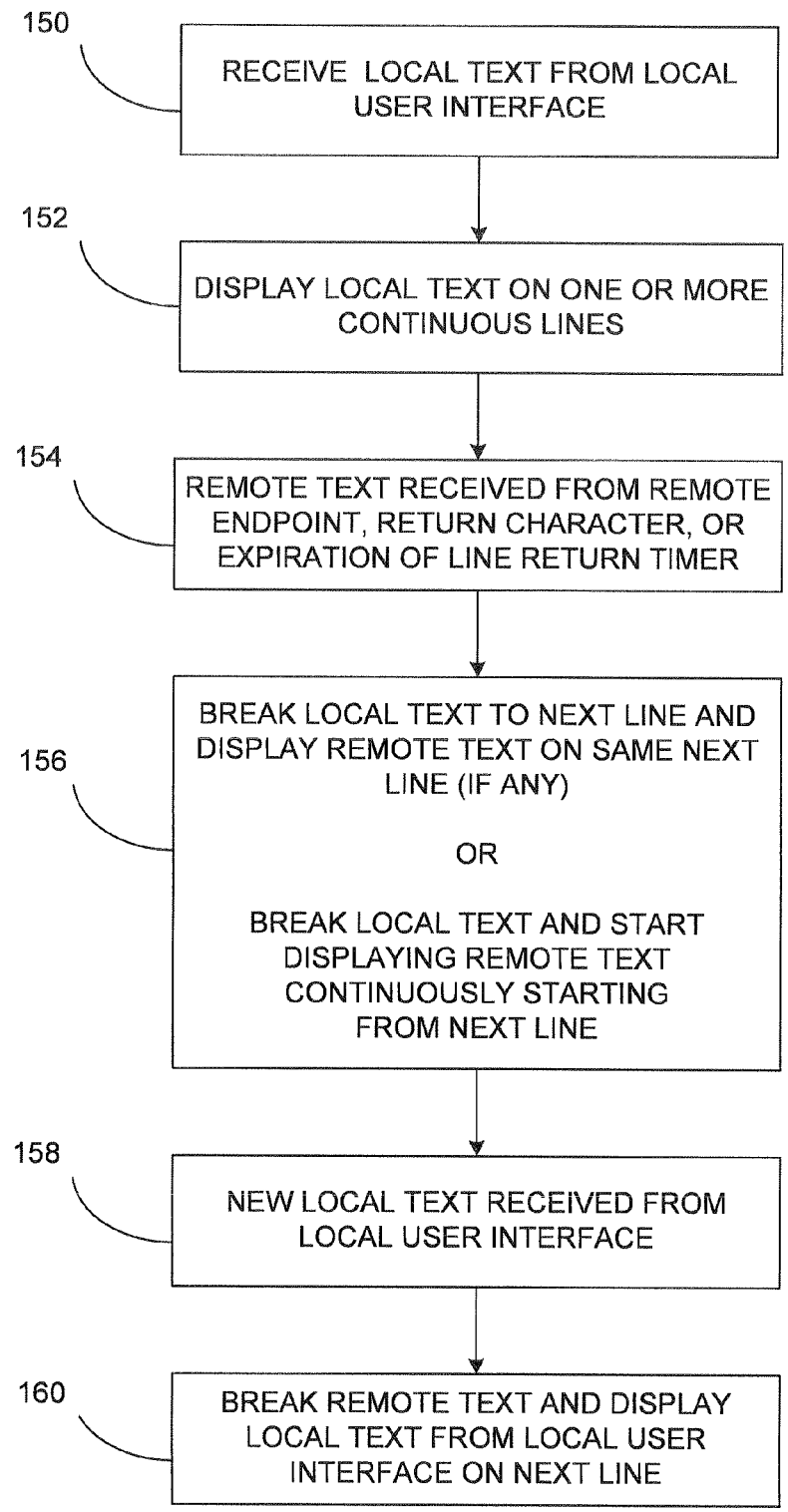
FIG. 8 is a flow diagram showing how text is displayed to show interruptions in a text dialog.

FIG. 8 explains in more detail how the text communication system 12 (FIG. 1) breaks lines of local text when remote text is received from a remote user. The processor 18 receives local text from the local user in operation 150 and displays the local text on one or more continuous lines of display 20 in operation 152. If remote text is received from the remote endpoint 26, a return or send character is received from the local user interface 22, or the line return timer expires in operation 154, the next characters from the local text are displayed on a new line in operation 156.

There are different display options that may be performed in operation 156. For example, the remote text (if any) may be displayed on the same line where the local text was broken, similar to what is shown in FIG. 7. Alternatively, when remote text is received, the processor 18 may interrupt the local text and start displaying the remote text on a next line directly underneath the currently displayed local text.

If new local text is received from the local user interface in operation 158, the remote text may be broken in operation 160 at the point in time when the new local text is received. Thus, the local user is provided with a vertical time line showing when different text streams are received by the local and remote users.

Users may also specify what causes a break in the displayed text. For example, users may individually set a specified time period for a pause that causes a line break, or users may individually set a character or sequence of characters that cause a line break. For example, a user may specify to the text communication system 12 that the "return" key should cause a line break. Alternatively, a user may arbitrarily specify the characters that cause a line break as described above. It should be understood that any variety of different techniques can be used to display the text from both the local user and the remote user. The techniques described above are just examples of possible implementations and other techniques can be used depending on desired display characteristics and the physical limitations of the display device.

Transmitting Complete Expressions

Figure 9:
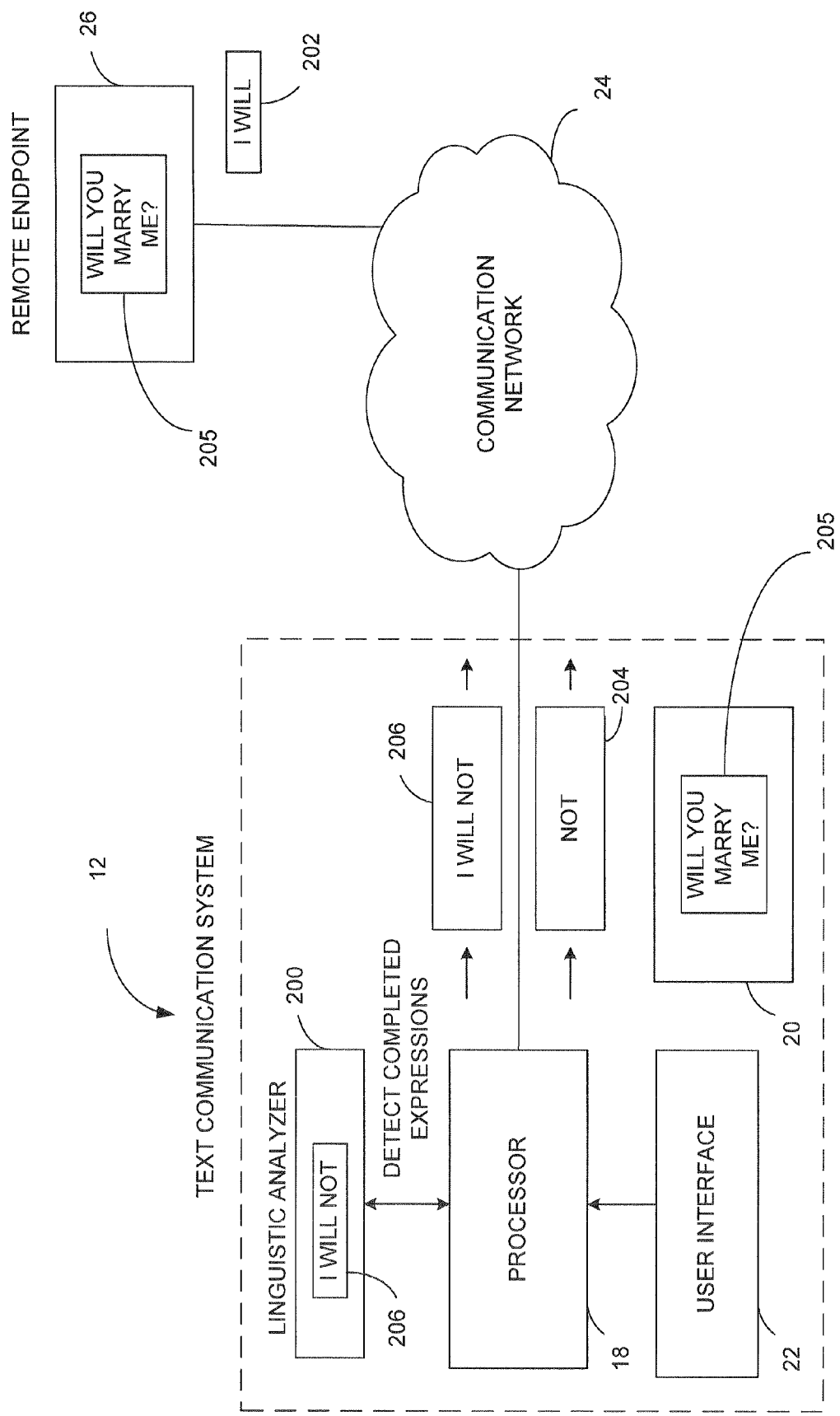
FIG. 9 is a block diagram showing how the communication quarantines characters until the characters form a complete expression.

Another aspect of the text communication system quarantines characters until the characters form a complete expression. Referring to FIG. 9, the text communication system 12 may receive text 205 from remote device 26. In this example, the text 205 asks the question: "Will you marry me?". The text 205 is received by text communication system 12 over communication network 24 and shown on display 20.

A user at interface 22 may type a response to message 205 such as the text 206 "I will not". However, conventional text messaging schemes may transmit and/or display different portions of the text 206 at different times. For example, it would be unfortunate if the first two words 202 "I will" were sent to remote endpoint 26 well before the third word "not" 204. This would give the user at endpoint 26, at least temporarily, the false impression that the offer of marriage was accepted. If the remaining word "not" 204 was unsuccessfully transmitted, the miscommunication could be a disaster. Regardless, the premature arrival of the first two words "I will" could cause the user at endpoint 26 to send an inappropriate response back to the user at endpoint 12. Thus, transmitting incomplete expressions can disrupt the dynamics of normal communications.

The text communication system 12 performs linguistic analysis that quarantines text until it forms some sort of complete expression. A complete expression can refer to any completed word, sentence, linguistic expression, or any other linguistic threshold that may improve text communications. The type or combination of completed expressions used in the text communication system 12 can be selected by the user or configured by a system administrator.

To explain in more detail, the characters 206 are entered by a user through user interface 22 and buffered in memory 200 until a complete expression is detected. In this example, linguistic analysis performed by processor 18 determines that the combination of quarantined text 206 forms a complete expression "I will not". Accordingly, the processor 18 un-quarantines and automatically sends the entire set of text 206 over communication network 24 to remote endpoint 26. The transmitted text 206 contains the complete expression or thought of the user. This prevents a misunderstanding or miscommunication when text arrives at remote device 26 and is read by a user.

Figure 10:
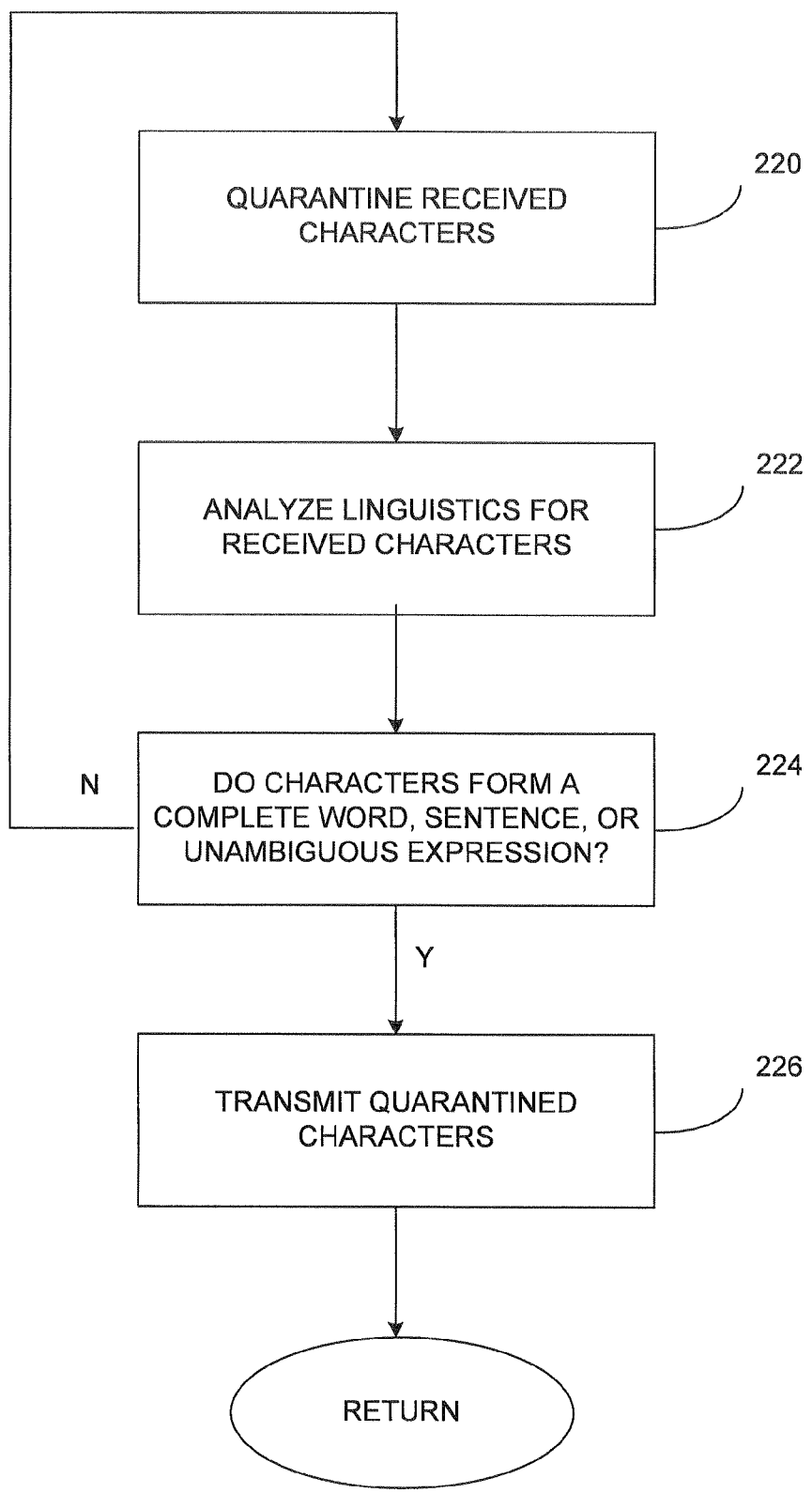
FIG. 10 is a flow diagram showing in more detail how the communication system in FIG. 9 operates.

FIG. 10 describes some of the different criteria that may be used by the text communication system 12 for identifying and transmitting a complete expression. In operation 220, the processor 18 (FIG. 9) quarantines received characters in memory 200. The processor in operation 222 continuously analyzes the linguistics of the quarantined characters. In operation 224, the processor 18 determines if the quarantined character form a complete word, sentence, or an unambiguous expression. Any combination of these different complete expression criteria may be used and it should be understood that these are just examples.

If the quarantined characters do not satisfy the complete expression criteria in operation 224, the processor 18 continues to receive and buffer more characters in operation 220. When the characters quarantined in memory 200 do satisfy the criteria for a complete expression, the processor 18 un-quarantines and transmits the characters in memory 200 to the remote endpoint 26 in operation 226.

Figure 11:
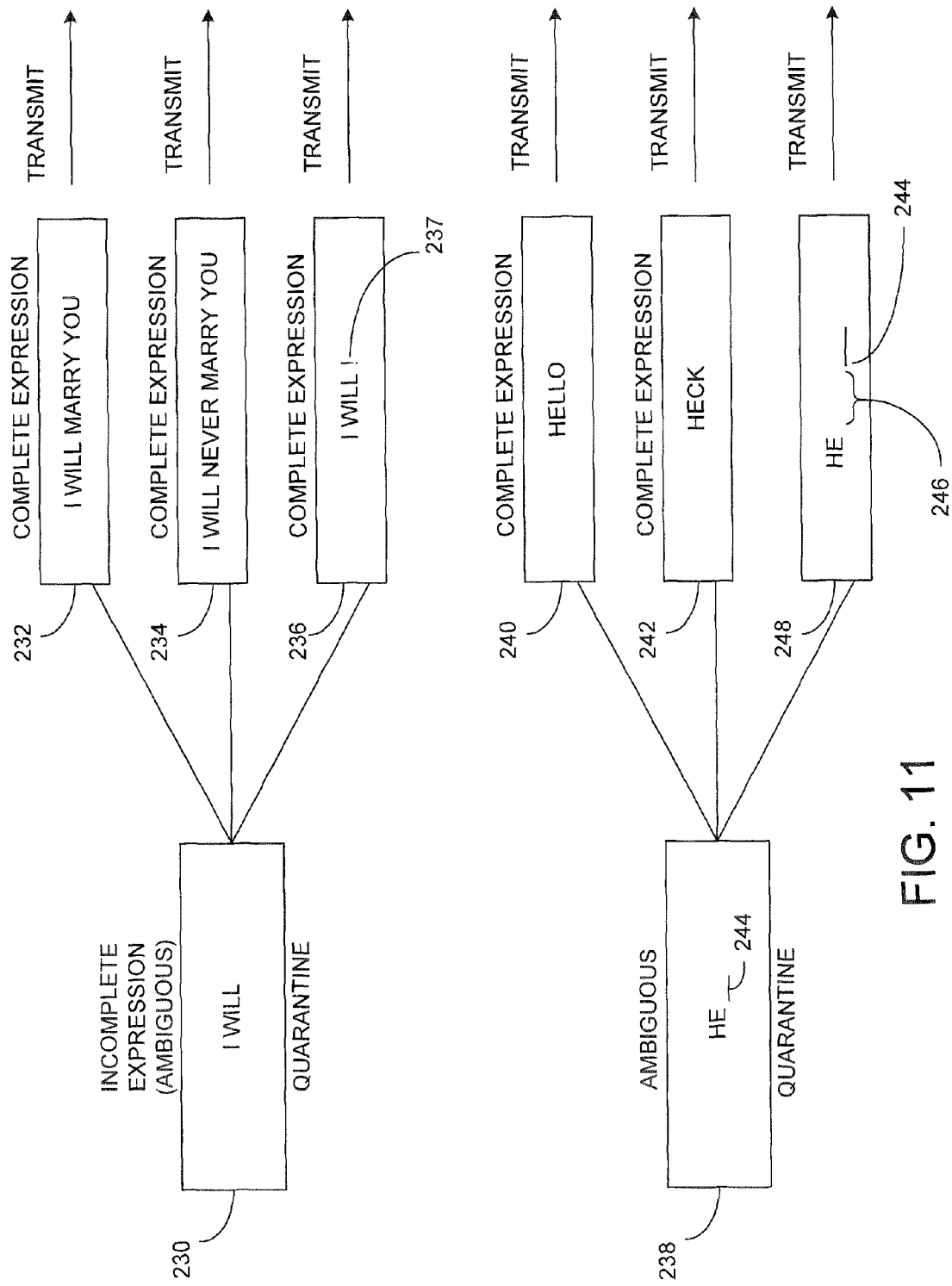
FIG. 11 are diagrams showing in more detail different types of complete expressions identified by the communication system in FIG. 9.

FIG. 11 gives a few additional examples of incomplete and complete expressions. A first incomplete expression 230 is similar to that shown in FIG. 9. The words "I will" are an incomplete or ambiguous expression since there are different meanings or thoughts that can still be expressed. Therefore, in this example, the text 230 will not be transmitted until some additional text is added.

One complete expression could be the phrase 232 "I will marry you". In this example, the linguistic analysis performed by processor 18 determines that the words 232 form an unambiguous linguistic expression. For instance, the words 232 may include all of the primary elements of a sentence structure. Similarly, the user might type in another set of words 234. The processor 18 may determine that this different combination of words 234 "I will never marry you" also forms an unambiguous linguistic expression. Therefore, the combination of words 234 would also be un-quarantined and transmitted to the destination endpoint.

Note that neither words 232 or words 234 require punctuation to indicate the completion of the expression. However, punctuation can also be used to identify a completed expression. For example, an exclamation point, period, comma, semicolon, or some other type of punctuation 237 may convert the incomplete expression 230 into a complete expression 236. The combination of characters 236 are accordingly un-quarantined and transmitted by processor 18.

In another example, a word is considered a complete expression. Individual characters 238 are quarantined in memory 200 until a complete word or sentence is formed. The characters 238 "He" can still be formed into several different words and therefore remain quarantined in memory 200. In one example, additional characters 240 are typed in by a user to form the word "Hello". The processor 18 determine that the characters "Hello" form a complete word and therefore un-quarantine and transmit characters 240.

In another example, additional characters 242 typed in by the user form the word "Heck" which is also considered by processor 18 to form a completed expression. Accordingly, the characters 242 are un-quarantined and transmitted.

In yet another example, the location of a cursor 244, or detection of a space character 246, may be used to identify a complete expression. For example, the cursor 244 in characters 238 may be located immediately to the right of the letters "He". The processor 18 determines that characters 238 do not constitute a complete expression since there is no space between the letter "e" and cursor 244. However, the processor 18 considers the characters 248 to be a complete expression when a space character 246 is detected between the letter "e" and cursor 244. Accordingly, the characters 248 are un-quarantined and transmitted to the destination endpoint.

In another example, the complete expression criteria can be used in combination with the other quarantine timing features described above in FIGS. 1-8. For example, if the characters 230 or 238 remain in the memory 200 beyond a quarantine time period, the processor 18 may automatically un-quarantine and transmit the characters to the remote endpoint.

As described above, there can be a variety of different criteria used to determine a completed expression and only a few exemplary examples have been presented. It should also be noted that heuristic linguistic algorithms exist that determine when text provides a complete unambiguous expression. These algorithms could be used by the processor 18 to determine when quarantined characters should be transmitted. In another example, the linguistic analysis performed by processor 18 may use algorithms similar to the grammar checking software used in word processing systems to identify completed expressions or complete sentence structures.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A communication system comprising:
    a processor configured to:
        transmit a plurality of characters over a communication network to a remote endpoint;
        quarantine the plurality of characters for a quarantine time period prior to the transmission;
        permit modification of one or more of the plurality of characters during the quarantine time period; and
    a display device configured to display the plurality of characters in substantially real time as the plurality of characters are received by the processor, wherein the plurality of characters are displayed on the display device during the quarantine time period, and wherein the plurality of characters are automatically transmitted to the remote endpoint at a conclusion of the quarantine time period.

2. The communication system according to claim 1, wherein the processor is further configured to distinguish the plurality of characters from one or more subsequently received characters according to a position of the plurality of characters in relationship to a cursor on the display device, wherein the subsequently received characters are displayed on the display device during the quarantine time period, and wherein the subsequently received characters are not automatically transmitted to the remote endpoint at the conclusion of the quarantine time period.

3. The communication system according to claim 2, wherein the processor is configured to reset the quarantine time period for the one or more subsequently received characters when the plurality of characters are transmitted to the remote endpoint, and wherein the processor is further configured to automatically transmit the one or more subsequently received characters to the remote endpoint at a conclusion of the reset quarantine time period.

4. The communication system according to claim 1, wherein the processor is configured to cause the plurality of characters to be displayed in a first manner indicating the plurality of characters have been transmitted, and wherein the processor is further configured to cause one or more subsequently received characters to be displayed in a second manner indicating the one or more subsequently received characters have not been transmitted.

5. The communication system according to claim 4, wherein the processor is configured to prevent modification of the plurality of characters displayed in the first manner, and wherein the processor is further configured to allow modification of the one or more subsequently received characters displayed in the second manner.

6. The communication system according to claim 1, wherein the processor is further configured to receive a response generated by the remote endpoint, wherein the response is displayed on the display device indicating when the response was received relative to when the plurality of characters were received.

7. The communication system according to claim 6, wherein the processor is further configured to display the response intermediate the plurality of characters indicating that the response was received before the plurality of characters were transmitted.

8. The communication system according to claim 7, wherein the processor is configured to cause a first portion of the plurality of characters to be displayed on a first display line of the display device prior to the response, and wherein the processor is further configured to cause a second portion of the plurality of characters to be displayed on a second display line of the display device after the response.

9. An apparatus, comprising:
    means for transmitting a plurality of characters over a communication network to a remote endpoint;
    means for quarantining the plurality of characters for a quarantine time period prior to the transmission;
    means for displaying the plurality of characters in substantially real time as the plurality of characters are received for quarantining, wherein the plurality of characters are displayed during the quarantine time period; and
    means for modifying one or more of the plurality of characters during the quarantine time period, wherein the plurality of characters are automatically transmitted to the remote endpoint at a conclusion of the quarantine time period.

10. The apparatus according to claim 9, wherein the quarantine time period begins when a first character of the plurality of characters is placed in a quarantine buffer.

11. The apparatus according to claim 9, further comprising means for moving to a next line of text of the means for displaying after a period of inactivity when no further characters of the plurality of characters are received.

12. The apparatus according to claim 9, wherein the quarantine time period is a predetermined period of time.

13. The apparatus according to claim 9, wherein the quarantine time period is user controlled.

14. A tangible computer-readable medium having stored thereon computer-executable instructions that, in response to execution by a computing system, cause the computing system to perform operations comprising:
    transmitting a plurality of characters over a communication network to a remote endpoint;
    quarantining the plurality of characters for a quarantine time period prior to the transmission;
    displaying the plurality of characters in substantially real time as the plurality of characters are received for quarantining, wherein the plurality of characters are displayed during the quarantine time period; and
    modifying one or more of the plurality of characters during the quarantine time period based on user input, wherein the plurality of characters are automatically transmitted to the remote endpoint at a conclusion of the quarantine time period.

15. The computer-readable medium according to claim 14, wherein the operations further comprise distinguishing the plurality of characters from one or more subsequently received characters according to a position of the plurality of characters in relationship to a cursor on a display device, wherein the subsequently received characters are displayed on the display device during the quarantine time period, and wherein the subsequently received characters are not automatically transmitted to the remote endpoint at the conclusion of the quarantine time period.

16. The computer-readable medium according to claim 15, wherein the operations further comprise:
resetting the quarantine time period for the one or more subsequently received characters when the plurality of characters are transmitted to the remote endpoint; and
transmitting the one or more subsequently received characters to the remote endpoint at a conclusion of the reset quarantine time period.

17. The computer-readable medium according to claim 15, wherein the operations further comprise:
displaying the plurality of characters in a first manner indicating the plurality of characters have been transmitted; and
displaying the one or more subsequently received characters in a second manner indicating the one or more subsequently received characters have not been transmitted.

18. The computer-readable medium according to claim 17, wherein the operations further comprise:
preventing modification of the plurality of characters displayed in the first manner; and
allowing modification of the one or more subsequently received characters displayed in the second manner.

19. The computer-readable medium according to claim 14, wherein the operations further comprise:
receiving a response generated by the remote endpoint; and
displaying the response on a display device indicating when the response was received relative to when the plurality of characters were received.

20. The computer-readable medium according to claim 19, wherein the operations further comprise displaying the response intermediate the plurality of characters indicating that the response was received before the plurality of characters were transmitted.

21. The computer-readable medium according to claim 19, wherein the operations further comprise:
displaying a first portion of the plurality of characters on a first display line of the display device prior to the response; and
displaying a second portion of the plurality of characters on a second display line of the display device after the response.

* * * * *